US008180675B2

(12) United States Patent
Blasko et al.

(10) Patent No.: US 8,180,675 B2
(45) Date of Patent: May 15, 2012

(54) SYSTEM AND METHOD FOR AUTOMATICALLY MANAGING AVAIL INVENTORY DATA AND AVAIL PRICING (75) Inventors: John P. Blasko, New Hope, PA (US); Charles A. Eldering, Doylestown, PA (US)

(73) Assignee: Prime Research Alliance E., Inc. (VG)

( * ) Notice: Subject to any disclaimer, the term of this patent is extended or adjusted under 35 U.S.C. 154(b) by 3047 days.

(21) Appl. No.: 09/742,527

(22) Filed: Dec. 21, 2000

(65) Prior Publication Data
US 2002/0083444 A1    Jun. 27, 2002

Related U.S. Application Data (60) Provisional application No. 60/229,156, filed on Aug. 31, 2000.

(51) Int. Cl.
*G06Q 30/00* (2012.01)
*H04N 7/10* (2006.01)
(52) U.S. Cl. ............... 705/14.69; 705/14.66; 725/35
(58) Field of Classification Search ........ 705/14.1–14.73
See application file for complete search history.

(56) References Cited

U.S. PATENT DOCUMENTS

| 4,930,011 | A | 5/1990 | Kiewit |
| 5,029,014 | A | 7/1991 | Lindstrom |
| 5,099,319 | A | 3/1992 | Esch |
| 5,155,591 | A | 10/1992 | Wachob |
| 5,201,010 | A | 4/1993 | Deaton |
| 5,231,494 | A | 7/1993 | Wachob |
| 5,271,626 | A | 12/1993 | Llenas |
| 5,319,455 | A | 6/1994 | Hoarty |
| 5,351,075 | A | 9/1994 | Herz |
| 5,400,166 | A | 3/1995 | Huber |
| 5,410,344 | A | 4/1995 | Graves |
| 5,424,770 | A | 6/1995 | Schmelzer |
| 5,446,919 | A | 8/1995 | Wilkins |
| 5,457,562 | A | 10/1995 | Tremblay |
| 5,532,732 | A | 7/1996 | Yuen |
| 5,534,911 | A | 7/1996 | Levitan |
| 5,559,549 | A | 9/1996 | Hendricks |
| 5,574,860 | A | 11/1996 | Perlman |
| 5,592,551 | A | 1/1997 | Lett |

(Continued)

FOREIGN PATENT DOCUMENTS
CA         2164608         12/1994
(Continued)

OTHER PUBLICATIONS

NCTA Technical Papers "Compressed Digital Commercial Insertion: New Technology Architectures for the Cable Advertising Business" 1992 8 pages.

(Continued)

*Primary Examiner* — Yehdega Retta
(74) *Attorney, Agent, or Firm* — Carlineo, Spicer & Kee, LLC (57) ABSTRACT A system, computer code, and method are provided for automatically managing avail inventory data of media programming streams for a communications network, such as a cable TV network. The computer-implemented method includes the steps of correlating available addressable units of the communications network with the avail inventory data, and generating a proposed price for purchase of at least one avail based on the results of the correlating step.

16 Claims, 5 Drawing Sheets

U.S. PATENT DOCUMENTS

| | | | |
|---|---|---|---|
| 5,600,364 A | 2/1997 | Hendricks et al. ............... 348/1 |
| 5,600,366 A | 2/1997 | Schulman | |
| 5,600,573 A | 2/1997 | Hendricks | |
| 5,612,742 A | 3/1997 | Krause | |
| 5,621,728 A | 4/1997 | Lightfoot et al. ............ 370/60.1 |
| 5,621,812 A | 4/1997 | Deaton | |
| 5,636,346 A * | 6/1997 | Saxe ................................ 705/1 |
| 5,644,723 A | 7/1997 | Deaton | |
| 5,649,114 A | 7/1997 | Deaton | |
| 5,650,994 A | 7/1997 | Daley ............................. 370/259 |
| 5,652,615 A | 7/1997 | Bryant | |
| 5,661,516 A | 8/1997 | Carles | |
| 5,724,091 A | 3/1998 | Freeman | |
| 5,724,521 A | 3/1998 | Dedrick ........................ 395/226 |
| 5,752,160 A | 5/1998 | Dunn | |
| 5,752,238 A | 5/1998 | Dedrick ........................... 705/14 |
| 5,754,938 A | 5/1998 | Herz | |
| 5,754,939 A | 5/1998 | Herz | |
| 5,774,170 A | 6/1998 | Hite | |
| 5,801,747 A | 9/1998 | Bedard | |
| 5,801,753 A | 9/1998 | Eyer | |
| 5,805,974 A | 9/1998 | Hite | |
| 5,808,694 A | 9/1998 | Usui | |
| 5,815,671 A | 9/1998 | Morrison | |
| 5,886,731 A | 3/1999 | Ebisawa | |
| 5,917,830 A | 6/1999 | Chen et al. | |
| 5,926,205 A | 7/1999 | Krause | |
| 5,931,901 A | 8/1999 | Wolfe et al. .................... 709/206 |
| 5,948,061 A | 9/1999 | Merriman | |
| 5,956,088 A | 9/1999 | Shen | |
| 5,966,120 A | 10/1999 | Arazi | |
| 5,969,715 A | 10/1999 | Dougherty | |
| 5,990,927 A | 11/1999 | Hendricks | |
| 6,002,393 A | 12/1999 | Hite | |
| 6,002,394 A | 12/1999 | Schein et al. ................. 345/327 |
| 6,006,257 A | 12/1999 | Slezak | |
| 6,009,409 A | 12/1999 | Adler et al. ...................... 705/14 |
| 6,009,410 A | 12/1999 | LeMole | |
| 6,020,880 A | 2/2000 | Naimpally | |
| 6,020,883 A | 2/2000 | Herz | |
| 6,026,368 A | 2/2000 | Brown | |
| 6,026,369 A | 2/2000 | Capek | |
| 6,029,045 A | 2/2000 | Picco | |
| 6,029,195 A | 2/2000 | Herz | |
| 6,038,256 A | 3/2000 | Linzer | |
| 6,055,510 A | 4/2000 | Henrick | |
| 6,055,573 A | 4/2000 | Gardenswartz | |
| 6,061,097 A | 5/2000 | Satterfield | |
| 6,088,722 A | 7/2000 | Herz | |
| 6,119,098 A | 9/2000 | Guyot et al. ..................... 705/14 |
| 6,141,010 A | 10/2000 | Hoyle | |
| 6,144,653 A | 11/2000 | Persson | |
| 6,160,570 A | 12/2000 | Sitnik | |
| 6,177,931 B1 | 1/2001 | Alexander | |
| 6,181,334 B1 | 1/2001 | Freeman | |
| 6,253,238 B1 | 6/2001 | Lauder et al. ................. 709/217 |
| 6,263,501 B1 | 7/2001 | Schein et al. ................... 725/39 |
| 6,292,786 B1 | 9/2001 | Deaton | |
| 6,334,108 B1 | 12/2001 | Deaton | |
| 6,359,902 B1 | 3/2002 | Putzolu | |
| 6,378,130 B1 | 4/2002 | Adams | |
| 6,418,122 B1 | 7/2002 | Schoenblum | |
| 6,424,998 B2 * | 7/2002 | Hunter .......................... 709/207 |
| 6,425,131 B2 | 7/2002 | Crandall | |
| 6,434,747 B1 | 8/2002 | Khoo | |
| 6,446,082 B1 | 9/2002 | Arita | |
| 6,446,261 B1 | 9/2002 | Rosser | |
| 6,459,427 B1 | 10/2002 | Mao | |
| 6,460,036 B1 | 10/2002 | Herz | |
| 6,463,585 B1 | 10/2002 | Hendricks | |
| 6,487,721 B1 | 11/2002 | Safadi | |
| 6,493,875 B1 | 12/2002 | Eames | |
| 6,505,169 B1 | 1/2003 | Bhagavath | |
| 6,516,002 B1 | 2/2003 | Huang | |
| 6,516,302 B1 | 2/2003 | Deaton | |
| 6,571,279 B1 | 5/2003 | Herz | |
| 6,583,825 B1 | 6/2003 | Yuen | |
| 6,615,039 B1 | 9/2003 | Eldering | |
| 6,631,523 B1 | 10/2003 | Matthews | |
| 6,675,385 B1 | 1/2004 | Wang | |
| 6,684,194 B1 | 1/2004 | Eldering | |
| 6,698,020 B1 | 2/2004 | Zigmond | |
| 6,704,930 B1 | 3/2004 | Eldering | |
| 6,718,551 B1 | 4/2004 | Swix | |
| 6,724,974 B2 | 4/2004 | Naruto | |
| 6,738,978 B1 | 5/2004 | Hendricks | |
| 6,796,555 B1 | 9/2004 | Blahut | |
| 6,820,062 B1 | 11/2004 | Gupta | |
| 6,820,277 B1 | 11/2004 | Eldering | |
| 2001/0013124 A1 | 8/2001 | Klosterman | |
| 2002/0026645 A1 | 2/2002 | Son | |
| 2002/0038455 A1 | 3/2002 | Srinivasan | |
| 2002/0083442 A1 | 6/2002 | Eldering | |
| 2002/0104083 A1 | 8/2002 | Hendricks | |
| 2002/0129374 A1 | 9/2002 | Freeman | |
| 2002/0152471 A1 | 10/2002 | De Haas | |
| 2002/0188943 A1 | 12/2002 | Freeman | |
| 2003/0093792 A1 | 5/2003 | Labeeb | |
| 2003/0200128 A1 | 10/2003 | Doherty | |

FOREIGN PATENT DOCUMENTS

| | | |
|---|---|---|
| CA | 2264392 | 1/1999 |
| CA | 2151458 | 2/2004 |
| EP | 1220542 | 7/2002 |
| WO | WO9712486 | 4/1997 |
| WO | WO 9717774 | 5/1997 |
| WO | WO9827723 | 6/1998 |
| WO | WO 9926415 | 5/1999 |
| WO | WO 9952285 | 10/1999 |
| WO | WO 9955066 | 10/1999 |
| WO | WO 9965237 | 12/1999 |
| WO | WO 9966719 | 12/1999 |
| WO | WO 0033233 | 6/2000 |
| WO | WO 0049801 | 8/2000 |
| WO | WO 0054504 | 9/2000 |
| WO | WO 0064166 | 10/2000 |
| WO | WO 0069163 | 11/2000 |
| WO | WO 0147279 | 6/2001 |

OTHER PUBLICATIONS

AdLink Engineering, Ad insertion wiring diagrams, 1999, 17 pages.
U.S. Appl. No. 09/204,888, filed Dec. 3, 1998, Eldering, Charles, A.
U.S. Appl. No. 09/635,539, filed Aug. 10, 2000, Eldering Charles, A.
U.S. Appl. No. 09/635,542, filed Aug. 10, 2000, Eldering Charles, A.
Gallagher et al "*A Framework for Targeting Banner Advertising on the Internet*", System Sciences, Jan. 1997, Proceedings of the 30th Hawaii International Conference. vol. 4. pp. 265-274.
McCandless. "*Web Advertising*", IEEE Intelligent Systems. Jun. 1998. vol. 13. pp. 8-9.
Chang et al. "*Goodies in Exchange for Consumer Information on the Internet: The Economics and Issues*". System Sciences, Jan. 1998., Proceedings of the 31st Hawaii International Conference. vol. 4. pp. 533-542.
Rossi, McCulloch, Allenby, "*The Value of Purchase History Data in Target Marketing*", Marketing Science; vol. 15, No. 4, 1996, 20 pgs.
Raskutti, et al., "*Acquiring Customer Preferences for Information Filtering: a Heuristic-Statistical Approach*", Proceedings of the 5th Int'l Conference on User Modeling, Kaluna-Kona, HI, USA, Jan. 2-5, 1996.
Armstrong, Larry, "*Coupon Clippers, Save Your Scissors*", Business Week, Jun. 20, 1994, pp. cover, table of contents, 164, 166.
Product literature, DoubleClick, "*Dynamic Advertising Reporting and Targeting (DART)*," printed from http://ww.doubleclick.net/dart on Jun. 19, 1998; 16pp.
Product literature, Imgis, "*Ad Force*," printed from http://www.starpt.com/core on Jun. 30, 1998; 5pp.
Product Literature, AdForce, "*AdForce Strategic Partners*", printed from http://www.adforce.com/home/cust3_part.htm on Mar. 27, 2000; 2pp.
Press Release, AdForce, "*AdForce Introduces AdForce EveryWhere: Advertising, Marketing & Promotions Wherever a Digital Signal Can Be Sent*", printed from http://biz.yahoo.com/bw/000327/ca_adforce_1.htm on Mar. 27, 2000; 3pp.

IEEE Paper, "*Netvertising: content-based subgeneric variations in a digital genre*" by Fortanet, I., Palmer, J. and Posteguillo, S. Jun. 1998, 12pp.
Product Literature, Engage Technologies, "*Engage. Discover*", Copyright 1997, 13 pgs.
Marketing Literature, FireFly Corporation, "*Firefly Passport*", 8 pgs.
Marketing Literature, Matchlogic Services, "*Matchlogic, Inc.*", 2 pgs.
Marketing Literature, Broadvision, "*The Power of Personalization*", 3 pgs.
Marketing Literature, Media Metrix, "*Frequently Asked Questions*", 2 pgs.
Net Perceptions Corporation, White Papers, "*Adding Value in the Digital Age*", 11 pgs.
Product Literature, Netgravity, Inc., "*AdServer 3*", 6 pgs.
Product Data Sheet, Open Sesame, "*Learn Sesame*", 3 pgs.
Product Literature, Aptex Software, Inc., "*SelectCast for Commerce Servers*", 2 pgs.
Product Literature, Aptex Software, Inc., "*SelectCast for Ad Servers*", 2 pgs.
Karpinski, Richard, Flycast "*Ad Sales Go Real Time*", Business Source Premier, Electronic Commerce, InternetWeek, Dec. 1, 1997 Issue 692, p. 19, 2 pgs.

* cited by examiner

MARKET SEGMENTATION

FOR DEMOGRAPHICS WITH ONLY TWO CHOICES, PLEASE SELECT EITHER ONE OR BOTH OPTIONS.
FOR DEMOGRAPHICS WITH MORE THAN TWO CHOICES, PLEASE SELECT ALL CATEGORIES THAT YOU WANT INCLUSIVE IN THE DESIRED RANGE.

SEGMENT NAME

[ TOYOTA ]

AGE

| | | | |
|---|---|---|---|
| ☐ 00-04 | ☐ 21-24 | ☑ 45-49 | ☐ 70-74 |
| ☐ 05-09 | ☑ 25-29 | ☑ 50-54 | ☐ 75-84 |
| ☐ 10-14 | ☑ 30-34 | ☐ 55-59 | ☐ 85 AND OVER |
| ☐ 15-17 | ☑ 35-39 | ☐ 60-64 | [ SELECT 25-29 ] |
| ☐ 18-20 | ☑ 40-44 | ☐ 65-69 | |

GENDER/ SEX

☑ FEMALE ☑ MALE

CHILDREN   USE 'AGE' TO SELECT THE AGE OF THE CHILDREN

☐ CHILDREN ☑ NO CHILDREN

INCOME

| | |
|---|---|
| ☐ UNDER $15,000 | ☑ $50,000-$74,999 |
| ☐ $15,000-$24,999 | ☑ $75,000-$99,999 |
| ☐ $25,000-$34,999 | ☐ $100,000-$149,999 |
| ☐ $35,000-$49,999 | ☐ $150,000 AND OVER |

OCCUPATION
☑ PROFESSIONAL/MANAGERIAL
☐ OTHER WHITE COLLAR
☐ BLUE COLLAR

HOUSEHOLD SIZE
☑ 1   ☑ 2   ☐ 3-4   ☐ 5-6   ☐ 7 OR MORE

MARITAL STATUS
☑ SINGLE   ☑ MARRIED   ☑ SEPARATED

RACE/ETHNIC BACKGROUND
☑ CAUCASION/WHITE ☑ AFRICAN AMERICAN
☐ HISPANIC   ☑ ASIAN-PACIFIC
☐ NATIVE AMERICAN

New  Delete  Save  Map

SYSTEM AND METHOD FOR AUTOMATICALLY MANAGING AVAIL INVENTORY DATA AND AVAIL PRICING

This patent application claims priority to U.S. Provisional Patent Application No. 60/229,156 filed on Aug. 31, 2000, owned by the same assignee of the present invention and entitled "Method and System for Addressable and Program Independent Advertising," which is herein fully incorporated by reference.

BACKGROUND OF THE INVENTION

1. Field of the Invention

The present invention relates to television advertising and, more particularly, to a system, computer code and method for automatically managing avail inventory data and avail pricing for a communications network.

2. Discussion of the Related Art

Television service providers (e.g., broadcast TV networks, cable TV networks) allocate a limited number of advertisement spots (or "avails" hereinafter) for each television channel or program within a certain time duration. These avails or the time slots in the channels (i.e., day part and channel) corresponding to these avails are sold to advertisers who want to advertise their products and/or services.

Typically, sales representatives from the television service provider solicit sale of avails/time slots from media agencies, business owners, or any entity interested in advertising (hereinafter "advertiser"). The sales representatives contact advertisers who might be interested in placing their advertisements in these time slots. To persuade the advertiser to purchase certain avails/time slots, the sales representatives may present to the advertiser statistical and geo-demographic data indicating that the viewers of the TV programs tied to these avails can be the advertiser's potential customers.

Once the advertisers decide to purchase a particular avail or multiple avails (or time slots), the sales representatives report the purchase agreements back to the central office at the television service network. The details of the purchase agreements are manually entered into the main computer at the central office for billing and accounting purposes. Then the clerks at the central office schedule the insertion of the advertisements into the avails of television programming streams based on these purchase agreements.

The advertisements of these advertisers are inserted into the purchased avails of television programming streams at a head end of the television service providing system, and the television programming streams with the inserted advertisements are broadcast to all subscribers of the television service network. Because the advertisements are tied to the specific channels and/or programs, any viewer who is tuned to the particular channel or program will see the inserted advertisements. However, the displayed advertisements may not draw the interests of all those viewers who are watching the channel since different viewers have varying interests, hobbies, backgrounds, and preferences. Therefore, this type of TV advertising has limited effectiveness.

With modern digital television service methods such as switched digital video (SDV) systems (in which television service is received over the telephone lines) via very high speed digital subscriber line (VDSL) which utilizes the concept of addressable set top boxes (STBs) which are coupled to the front end of the subscriber's television and process the data stream before forwarding a channel to the television, more personalized service is now available. For instance, two-way communication between the subscriber's set top box and the service provider via the network is possible. Further, the service provider can send different data to different subscribers. In telephone line based systems such as SDV, the service provider can actually send different information to any individual subscriber. In many digital cable systems, different data can be sent to different groups of subscribers, e.g., through addressable STBs or cable nodes serving several hundred subscriber households.

Using these modern digital television service systems, targeted TV advertising with increased effectiveness is possible. In accordance with one targeted TV advertising method, advertisements that have been prepared to interest particular subscribers of the television service network are inserted into the avails of the television programming stream for those particular subscribers, so that different subscribers of the same television program may view different advertisements that are particularly directed to them. PCT Patent Publication No. WO 99/66719 entitled "Techniques for Intelligent Video Ad Insertion," which is herein incorporated by reference, discloses at least one such scheme. Other such schemes are discussed in parent Provisional Patent Application No. 60/229,156.

Even in such advertising systems, however, the television service providers still sell and manage the avails/time slots through personal contact (e.g., via sales representatives) as it is done in conventional TV advertising systems. This conventional avail management process, unfortunately, can be extremely time consuming and inefficient for a number of reasons. For example, it requires person-to-person communication between the sales representatives and advertisers. The sales representatives must spent much time and energy in preparing their presentations so that the advertisers would be interested in purchasing the avails/time slots. Further, the sales representatives must communicate all avail purchase agreements back to the central office. All this requires time and energy on the part of the sales representatives. Moreover, the conventional avail management process is prone to human error because the sales representatives must communicate the details of the purchase agreements back to the central office, which are entered into the main computer manually. In addition, the use of the conventional process inconveniences the advertisers because they have to adhere to the schedule of the sales representative in order to purchase avails and to inquire into the availability and pricing of the avails.

Accordingly, an object of the present invention is to provide a technique by which advertising and sale of avails can be automated-to expedite the avail management process.

Another object of the present invention is to provide a computerized avail management technique for use with targeted television advertising schemes.

Still another object of the present invention is to provide a computer-implemented method and system for automatically managing avail inventory data and avail pricing for a communications network such as a cable TV network.

A further object of the present invention is to provide a computer program product for managing avail inventory data and determining avail prices for advertiser-preferred market segments.

SUMMARY OF THE INVENTION

The present invention is a computer interface between an advertiser and a communications network operator, such as a cable TV network operator. In accordance with one embodiment, this interface is an avail management system for automatically managing avail inventory data and avail pricing for the network. The system may execute a series of computer programs to interact with the advertiser and to provide various analyses to the advertiser regarding advertising opportunities with the network.

In accordance with one embodiment, a communications network (e.g., a television service network such as a cable TV network) can transmit different TV programs or advertisements to different subscribers or groups of subscribers on the network. This can be accomplished by selectively addressing set top boxes or cable nodes assigned to these subscribers or groups of subscribers. The addressable set top boxes or cables nodes are also referred to herein as addressable units.

In accordance with one embodiment, the avail management system is applicable to any media program service system using addressable units, such as digital cable systems, switched digital video (SDV) systems, digital broadcast satellite (DBS) systems, the Internet, etc.

The avail management system may include a user interface device and a correlation & analysis module, all operatively coupled. The user interface device, such as a personal computer (PC), receives a user's (advertiser's) inputs and communicates them to the correlation & analysis module. The user interface device may be installed with a computer program that allows an advertiser to select certain segment characteristics (e.g., income level, gender, etc.) to define an advertiser-preferred market segment. The correlation & analysis module receives the advertiser-preferred market segment from the user interface device and may perform a number of different analyses, including, but not limited to, an analysis of available addressable units on the network for displaying ads, an analysis of available avails that correspond to the available addressable units, and an analysis of avail pricing for providing proposed prices of the avails. Through the user interface device, the advertiser can also select certain price-varying parameters (e.g., number of households in the addressable units) so as to receive different pricing for different avail selections. In addition, the avail management system performs avail purchase procedures so that the advertiser can purchase the avails through the system without any or minimal human intervention.

Other objects and advantages of the present invention will be set forth in part in the description and the drawings which follow, and, in part, will be obvious from the description or may be learned by practice of the invention.

DETAILED DESCRIPTION OF THE PREFERRED EMBODIMENTS

In the present specification, a "user" refers to an advertiser, an agent of an advertiser, an operator sales representative, a media planner, a media agency or any individual or entity interested in purchasing avails offered by media programming service networks such as broadcast TV networks, Internet service networks, cable TV networks, digital broadcast satellite TV networks, etc.

"Addressable units" refer to units assigned to each subscriber or a group of subscribers of the media programming service networks, which are selectively addressable by the programming service network. The addressable units may include, but are not limited to, individually addressable set top boxes (STBs) or addressable nodes on the network corresponding to a plurality of subscriber households. In certain types of known television service systems such as switched digital video (SDV), which is delivered over the phone lines, each subscriber household is individually addressable. Accordingly, each individual subscriber household comprises an addressable unit. In other known television service systems such as most present digital cable television communication networks, addressability resolution exists only down to the network node level. Typically, each network node services several hundred households.

Figure 1:
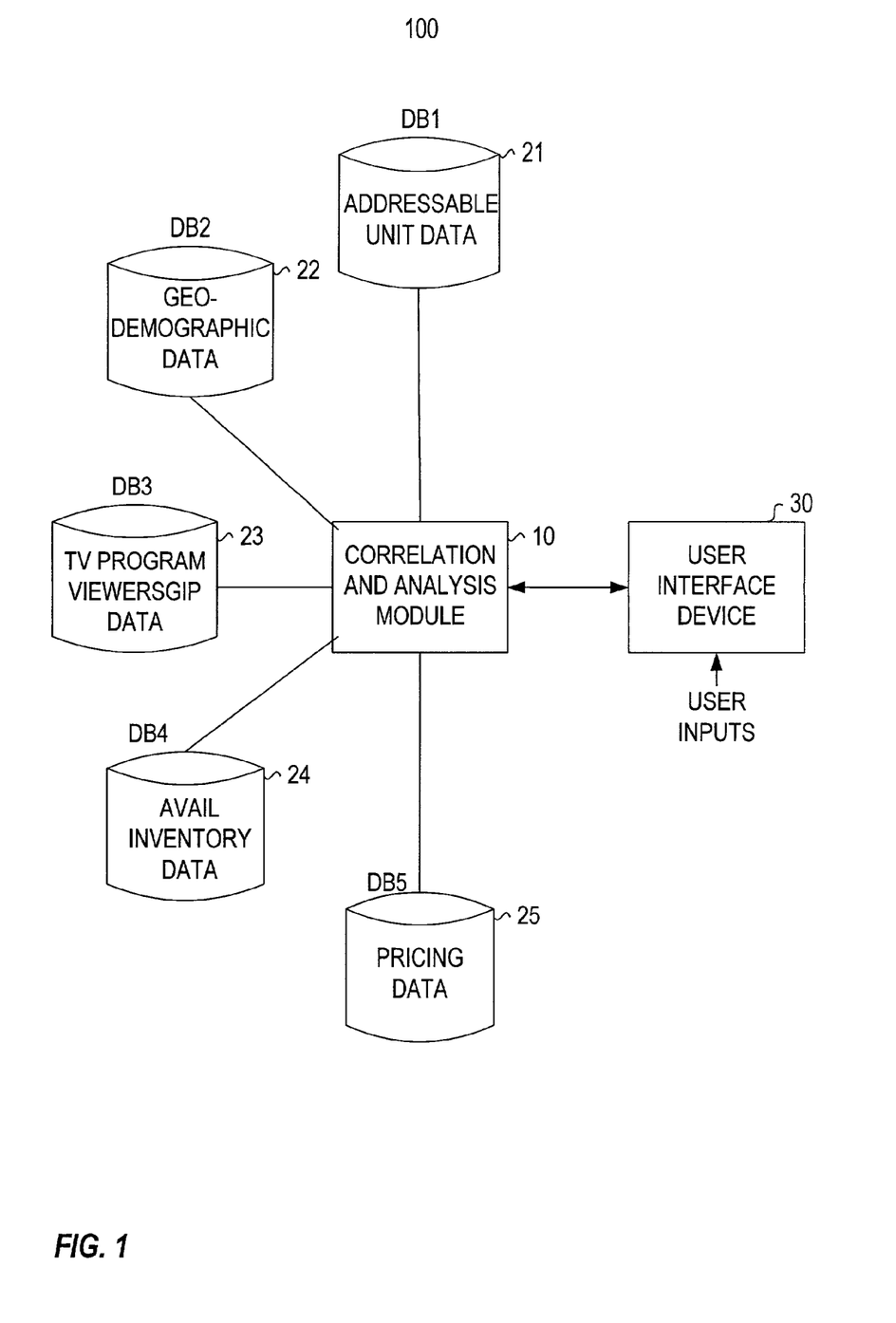
FIG. 1 is a block diagram of an avail management system according to a preferred embodiment of the present invention.

Now, referring to the drawings, a preferred embodiment of the present invention will be described. FIG. 1 shows a block diagram of an avail management system according to a preferred embodiment of the present invention. This system or a portion thereof may reside at the side of any media programming service network (e.g., a cable TV network) having addressable units discussed above. For example, this system or a portion thereof may reside at the head end (i.e., central office) of modern television service networks, e.g., VDSL, digital cable, DBS, or SDV networks. Parent Provisional Application No. 60/229,156 describes in detail some modern television service networks using addressable units, including the above-identified types of networks.

As shown in FIG. 1, the avail management system 100 includes a correlation & analysis module 10, a plurality of databases 21-25, and a user interface device 30, all operatively coupled.

The user interface device 30 functions as an interface between the correlation & analysis module 10 and the user. It receives user's inputs, and processes and directs the received inputs to the correlation & analysis module 10. It also receives any outputs from the correlation & analysis module 10 and communicates the received outputs to the user via a display device. The user interface device 30 may be a computer such as a PC, a lap top, a handheld, etc., which may include a display device capable of displaying graphics and text, an input device such as a keyboard, a mouse, and/or an optical pen, a CPU (central processing unit) for executing computer programs, and a memory for storing data therein. The user interface 30 may communicate with the correlation & analysis module 10 over a communications network such as the Internet, an intranet, etc.

The correlation & analysis module 10 receives a user's inputs from the user interface device 30, and processes them. The correlation & analysis module 10 includes computer software for executing various algorithms using data stored in the databases 21-25 and user inputs. These algorithms include, but are not limited to, correlation algorithms for correlating different data (e.g., user's input data with stored data), optimization algorithms for finding solutions to optimization problems, and pricing algorithms for determining prices given various parameters and/or restrictions. Such algorithms are well known in the art and can be implemented using computer programs.

The correlation & analysis module 10 can output the results of the execution of these algorithms to the user interface device 30 for display to the user. These results can be displayed in a variety of different ways, e.g., in graphs, charts, texts, drawings, maps, tables or any combination thereof. The correlation & analysis module 10 can also update or store new data in the databases 21-25.

In accordance with one embodiment, the first database 21 may store data pertaining to all addressable units (e.g., STBs or cable nodes) of the television service provider.

The addressable unit data may include, but are not limited to, names and addresses of subscribers corresponding to the addressable units, billing and subscription information for the subscribers, etc.

The second database 22 may store geo-demographic data identifying geo-demographic characteristics of each household, neighborhood or group of neighborhoods in the network territory. These characteristics may include, but are not limited to, average income, average age, dominant race, etc. Currently, several marketing firms provide such geo-demographic data. For example, Claritas Inc. has a database of different neighborhoods or groups of neighborhoods in the country with identified geo-demographic characteristics, which is searchable by using zip code+4 identifiers. In the Claritas system, the probablalistic geo-demographic characteristics of any individual residing in the country can be identified by entering the zip code+4 information found in the mailing address of the individual.

The third database 23 may store TV program viewership data identifying the types or names of TV programs that people in each neighborhood or groups of neighborhoods in the country tend to watch. Marketing firms and other research companies provide such data. For example, the Claritas system can identify the types or names of TV programs that individuals in certain neighborhoods tend to watch. The TV program viewership data may further identify other program data, such as the average viewing time for each program in these neighborhoods. In accordance with one embodiment, the program viewership data may be identified using zip code+4 identifiers.

The fourth database 24 may store avail inventory data identifying a list of avails designated by the network. The avail inventory data may identify the duration of each of the avails, general or specific presentation time for the avails, channels or programs which may be associated with the avails, purchase status of the avails, etc. The avail inventory data may further identify the names, addresses, and other information directed to the purchasers of the avails, details of the avail purchase agreements, etc.

The fifth database 25 may store therein pricing data usable in determining different prices for avails. In one embodiment, the pricing data are set by the programming service network in advance. In another embodiment, the pricing data may be systematically updated depending on interest rates, time of year (e.g., different rates for holidays), etc. The pricing data may include, but are not limited to, a list of base prices for different avails, and price adjustment data for adjusting the base prices in view of price varying factors, such as the duration of the avails, presentation time for the avails, channel and/or program associated with the avails, etc. In accordance with one embodiment, the base prices for the avails may be adjusted (e.g., discounted or increased) in view of certain factors, such as a total number of avails being purchased by the user, the size of available addressable units selected by the user, correlation index for the selected avails and available addressable units, application of avail discounts, etc. In one application, the pricing adjusting data may include a list of amounts in dollars, which may be subtracted or added to the selected base price in view of the price varying factors.

It should be understood by those of skill in the art that the data and information stored in the databases 21-25 may be combined in a variety of ways so that one or more databases can store such data therein. For example, the addressable unit data stored in the first database 21 may be correlated with the geo-demographic data stored in the second database 22 such that one database stores therein addressable unit data associated with the geo-demographic data.

Figure 2A:
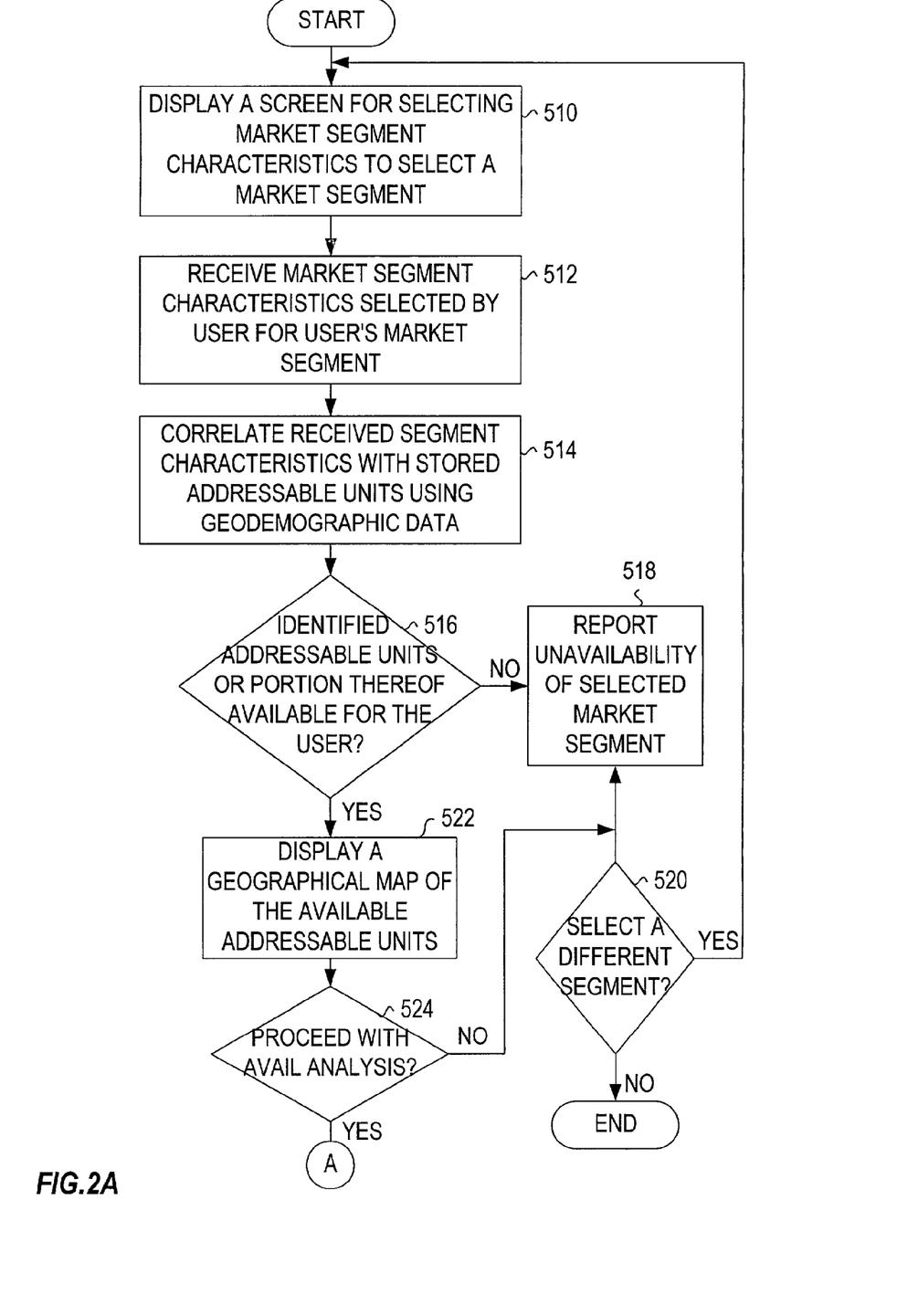
FIGS. 2A and 2B are flowcharts illustrating the processing steps involved in a computer-implemented avail management method according to a preferred embodiment of the present invention.
Figure 2B:
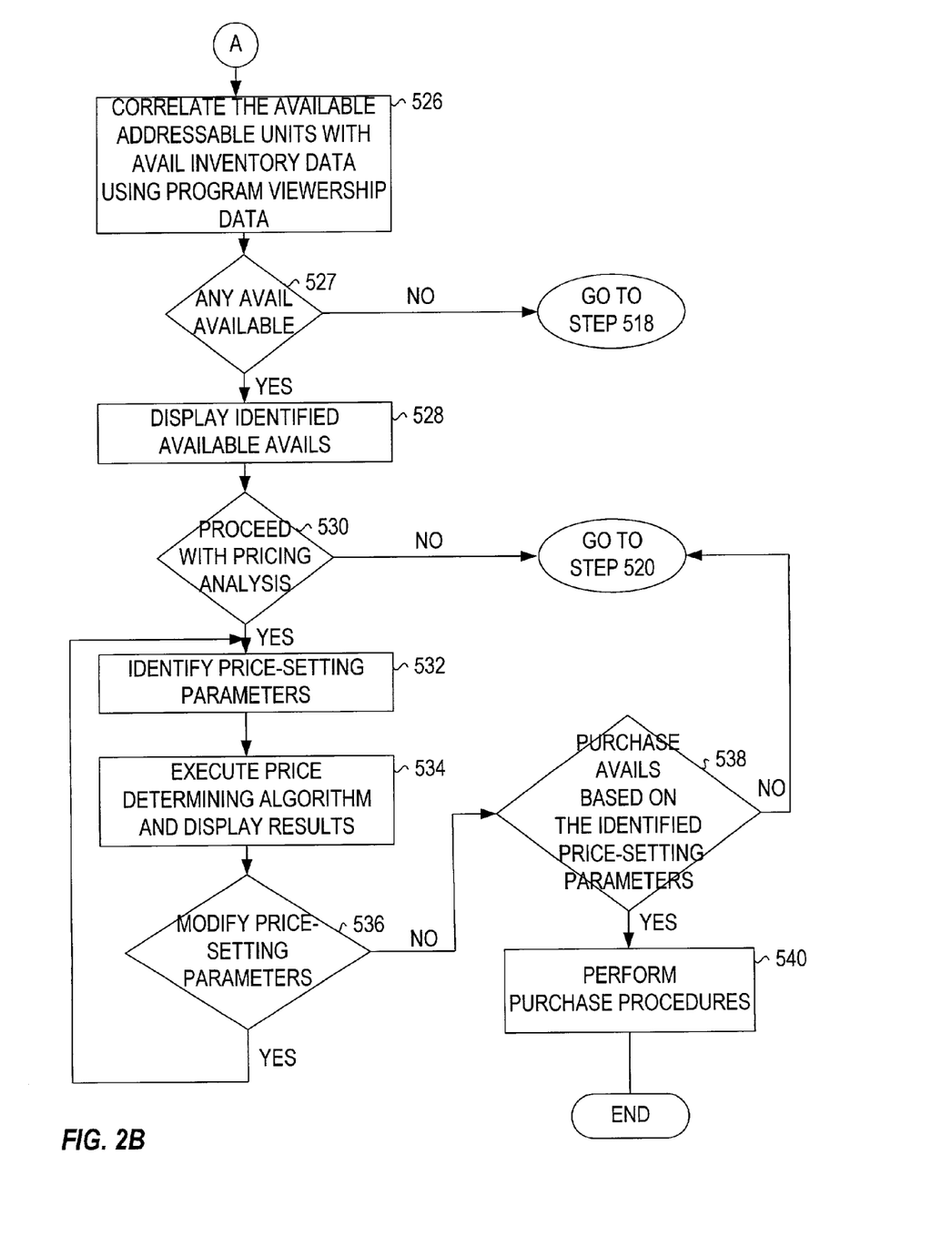

FIGS. 2A and 2B are flowcharts illustrating the processing steps involved in a computer-implemented avail management method according to a preferred embodiment of the present invention. The processing steps shown in FIGS. 2A and 2B may be implemented in the system shown in FIG. 1, and may be performed by executing computer programs in the correlation & analysis module 10 and/or user interface device 30.

In accordance with the preferred embodiment of the present method, if the user is interested in analyses of market segment, avail inventory and avail pricing, the user can approach the user interface device 30 and receive complete analyses of the user's preferred market segment, availability of avails, and avail pricing adjusted to fit the needs of the user. The user can also purchase avails through the user interface device 30.

As shown in FIG. 2A, in Step S10, when the user approaches the user interface device 30, a screen or computer page for defining the user-preferred market segment is presented on a display device, such as a monitor of the user interface device 30. The monitor may display a screen listing a number of different segment characteristics from which the user can select using an input device (e.g., a mouse, an optical pen, a keyboard) of the user interface device 30. The segment characteristics may include, but are not limited to, age, gender, income range, occupation type, household size, race/ethnic background, and/or marital/children status.

The user selects appropriate segment characteristics from the computer screen to form his or her preferred market segment. The user may rely on consumer survey data or other behavioral data in identifying the segment characteristics which best reflect the characteristics of the likely buyers of the advertised products or services.

In Step S12, the market segment characteristics selected by the user are transferred from the user interface device 30 to the correlation & analysis module 10.

In Step S14, the correlation & analysis module 10 correlates the received segment characteristics with the addressable unit data stored in the first database 21 using the geo-demographic data stored in the second database 22, and identifies those addressable units with the segment characteristics selected by the user. This may be accomplished as follows. The correlation & analysis module 10 may execute correlation programs which search the second database 22 for neighborhoods or groups of neighborhoods manifesting the segment characteristics selected by the user. The search results may indicate a list of neighborhoods or groups of neighborhoods with correlation indexes indicating the strength of these correlations. As discussed above, these neighborhoods or groups thereof may be identified by zip code+4 data. Then, the zip code+4 data of all addressable units in the network, which are stored in the first database 21, are compared with those of the identified neighborhoods or groups thereof to find addressable units in the network which have the segment characteristics selected by the user.

In Step S16, a determination is made whether or not the identified addressable units or any portion thereof is actually available for addressing by the user. There may exist several reasons why the television service network may not want to allow all identified addressable units to be available to the user. One reason may be to distribute or share "highly desirable" avails among a maximum number of advertisers so as to satisfy as many advertisers as possible. "Highly desirable" avails are avails highly sought by the advertisers because they have a higher return, e.g., due to a high number of viewers or high income viewers associated with such avails. For instance, avails for showing during the Monday Night Football may be more valuable and sought after by the advertisers than avails for showing during the Jerry Springer Show, because more people and perhaps, higher income people, watch the Monday Night Football than the Jerry Springer show. Furthermore, the sharing of "highly desirable" avails may be an efficient way to allocate limited avails with a return of maximum profit. Thus, it can benefit both the advertisers and the television service provider.

The television service provider may set certain criteria for determining whether each of the identified addressable units should be made available to the user. For example, criteria can be set such that only a certain percentage of the identified addressable units may become available to each user. This percentage may vary depending on the market segment characteristics selected by the user. For instance, some advertisers (users) prefer to broadcast their advertisements to viewers who have high income. Therefore, if the user has selected as part of the segment characteristics the income greater than $50 K/yr, only a certain percentage (e.g., 10%) of the identified addressable units with incomes over $50 K/yr may become available to each such user so that different users can address at least a portion of those addressable units assigned with income greater than $50 K/yr. On the other hand, if the user has selected a less desirable segment among advertisers in general, e.g., subscribers with an income below $30 K/yr as part of the user's segment characteristics, a higher percentage (e.g., 30%) of the identified addressable units may become available to each such user.

In accordance with one embodiment, this scheme may be implemented by programming the module 10 to allow only a certain percentage of the identified addressable units to become available to each user. This percentage may be changed based on the purchase status of the avails. For example, a high percentage number may be assigned if the presentation time of the avail is near and the avail has not been sold. For instance, the system may make available 100% of the remaining identified addressable units to the user if only several days remain until the presentation time of the avail in question.

If, in Step S16, a determination is made that none of the identified addressable units are available to the user, a report is generated by the correlation & analysis module 10 indicating the unavailability of the addressable units, i.e., the market segment selected by the user, in Step S18. This report may be a text report displayed to the user on the display device of the user interface device 30. In view of the unavailability of the currently selected market segment, the user is asked if he or she wishes to select a different market segment in Step S20. This may be accomplished by displaying a query text to the user on the display device of the user interface device 30. If the user wishes to select a new segment, the user may respond to the query text (e.g., by clicking a "yes" box) and the process returns to Step S10 wherein the screen for selecting the market segment characteristics is displayed. Otherwise, the user may click a "no" box or the like, and end the process. On the other hand, in Step S16, if the correlation & analysis module 10 indicates that at least a portion of the identified addressable units can be made available to the user, then the correlation & analysis module 10 may display a geographical map showing the locations of the available addressable units on the display device of the user interface device 30 in Step S22. In alternative embodiments, the identified available addressable units can be communicated to the user in a variety of different ways, e.g., by generating audio sounds through the user interface device 30.

In Step S24, the user may have an option of proceeding with an avail analysis for analyzing availability of avails in the avail inventory. This option may be displayed on the display device of the user interface device 30 for the user's selection. If the user does not wish to proceed with the avail analysis (which may be indicated by clicking a "no" button on the display device, for example), the process proceeds to Step S20 and subsequent steps discussed above, wherein the user has the option of selecting a different market segment.

If, in Step S24, the user wishes to proceed with the avail analysis (which may be indicated by clicking a "yes" or "avail analysis" button on the display device, for example), then the process proceeds to Step S26 shown in FIG. 2B. In Step S26, the correlation & analysis module 10 correlates the available addressable unit with the avail inventory data stored in the fourth database 24 using the TV program viewership data stored in the third database 23, to identify a list of available avails for the user's selected market segment. This correlation may involve executing optimization programs to select the most appropriate avails in view of the selected market segment characteristics and available addressable units.

In accordance with one embodiment, Step S26 may be implemented as follows. The correlation & analysis module 10 may search the third database 23 for the names or types of TV programs that the viewers associated with the available addressable units tend to watch. Since both the addressable units and the TV program viewing habits can be identifiable by zip code+4 identifiers, the module 10 may look for TV programs associated with the zip code+4 of the available addressable units, to identify the names or types of TV programs that the viewers at the available addressable units tend to watch. Unpurchased avails associated with the identified subscribers or subscriber groups (e.g., nodes) and/or types of TV programs are considered available avails for the identified available addressable units.

In Step S27, if none of the avails are available (e.g., they are all sold or other restrictions are applied), the method proceeds to Step S18 for reporting unavailability of the selected market segment and to subsequent steps as discussed above. On the other hand, if at least minimum number of avails is available for advertising, in Step S28, the identified available avails are displayed to the user. For example, a list of avails and avail descriptions (e.g., length of avail, channel associated with the avail, and presentation time of avail) associated with the avails may be shown on the display device of the user interface device 30. In accordance with one embodiment, other information associated with the avails, such as a base price for each of the available avails, may be displayed on the display device. The base price for each avail may be stored in the fifth database 25 and can be output to the user without performing avail pricing analysis discussed below. In accordance with another embodiment, a display of any pricing information may occur after or as part of the avail pricing analysis at a later step.

In Step S30, if the user desires avail pricing analysis, the method proceeds to Step S32. The user can communicate this desire by a number of different ways, e.g., by clicking or touching any button on the computer screen designated for running avail pricing analysis, or by speaking the command sounds. If the user does not desire avail pricing analysis (which may be indicated, e.g., by clicking a "no" button for avail pricing analysis), the process returns to Step S20 and subsequent steps, wherein the user is requested to select a different market segment.

In Step S32, the user may select parameters which determine or vary the price of the available avails. Such parameters are referred to herein as "price-setting" parameters, and may include, but are not limited to, the size or a number of available avails selected by the user, the size or a number of available addressable units selected by the user, frequency of ad presentation selected by the user, etc. That is, in accordance with one embodiment, the user does not need to purchase all the identified available avails, but may have an option of selecting a subset of the identified available avails. For example, the user may select only a few avails which are tied to specific programs or channels, presentation time, etc. Similarly, the user may not want to address all the identified available addressable units for displaying ads, and has an option of selecting a subset of the identified available addressable units. In one embodiment, the user may select a random number of the identified available avails from the entire list, or may select those of the identified available avails corresponding to a particular geographical region or area. The prices for the avails may vary depending on these selections. In accordance with one embodiment, the display device of the user interface device 30 may show a screen with a list of the price-setting parameters. The user may select one or more of the shown parameters, or type in the desired price-setting parameters, which are then communicated back to the correlation & analysis module 10.

In Step S32, a price determining program, which may reside in the correlation & analysis module 10, is executed by the module 10. Various types of price determining computer programs are well known in the art, and can be used herein as long as they are modified in accordance with the application of the present invention. Such modifications would be apparent to one skilled in the field of software programming.

In accordance with one embodiment, the price determining program determines the price of the available avails in view of the user selections made in Step S32 and other price determining factors, e.g., size of subscriber audience selected by user, nature of demographic traits selected by user (e.g., premium or highly sought-after demographics such as high income versus less desirable demographics), correlation indexes indicating the strengths of correlations, frequency of purchases by the advertiser, application of promotional discounts, scheduled presentation time or day part for the avails selected by the user (e.g., higher price for evening ads than early morning ads), programming network, status of remaining avail inventory, etc. A list of different prices or price adjustment data associated with the selections of the price-setting parameters and the other price determining factors, may be stored in and provided by the fifth database 25.

In accordance with one embodiment, the price determining program may be configured to consider all the factors that can vary the avail price, including the price-setting parameters. These factors may be identified by the programming service provider in advance, and may be written into the price determining program by a programmer. The price determining program then calculates the price of the selected avails in view of these factors using the pricing data stored in the fifth database 25, and may output the results to the user on the display device of the user interface device 30. In one embodiment, the results of the pricing analysis may be overlaid on the geographical map of the available addressable units discussed in Step S22. In another embodiment, the results of the pricing analysis may be displayed along with this geographical map in one page. It should be understood that there exist numerous different ways and techniques to display the results of the pricing analysis, which may occur with or without the display of previous correlation results.

In Step S36, if the user wishes to modify any of the price-setting parameters (e.g., the user wants to select more avails), then the method returns to Step S32 and subsequent steps, wherein the user can select different price-setting parameters and receive pricing analysis based on the selected parameters. In one embodiment, the user can change the price-setting parameters as many times as desired. If, in Step S36, the user does not wish to change the currently selected price-setting parameters, then in Step S38 the user has an option of purchasing the selected avails based on the parameters and the price(s) identified in step S34. If the user does not want to purchase the identified avails in Step 38, then the method returns to Step S20 and subsequent steps discussed above, wherein the user can select a different market segment. If, however, the user wants to purchase the identified avails in Step S38, then in Step S40 the user can communicate the purchase decision to the user interface device 30, e.g., by clicking or touching a button designated for executing purchase procedures. The user interface device 30 communicates this purchase decision back to the correlation & analysis module 10 which in turn performs the purchase procedures. The purchase procedures may include, but are not limited to, receiving payment information (e.g., name & address of the purchaser, account number, credit information, etc.) from the user through the user interface device 30, processing the payment information (e.g., obtaining authorization from a credit card company or an authentication agency), and communicating this process to the user (e.g., displaying a payment confirmation page or an error message). In one embodiment, on-line purchase procedures that are well known in the art may be used herein.

One skilled in the art would readily appreciate that certain variations or changes in the order of execution of the processing steps shown in FIGS. 2A and 2B are possible as part of the invention. For example, instead of selecting the market segment and then correlating available addressable units with avail inventory to identify available avails, the user may have an option of first selecting TV programs, program types, channels, time slots (day part and channel) or any combination thereof, and then selecting the market segment, which can be correlated with the previous selections.

Furthermore, different parts of the system or databases may be available to different users such that, if desired, only a portion of the system or analyses may be accessible to a certain user. For example, avail pricing and avail inventory database and/or analyses may be available only to network sales representatives and not to the advertisers.

Figure 3:
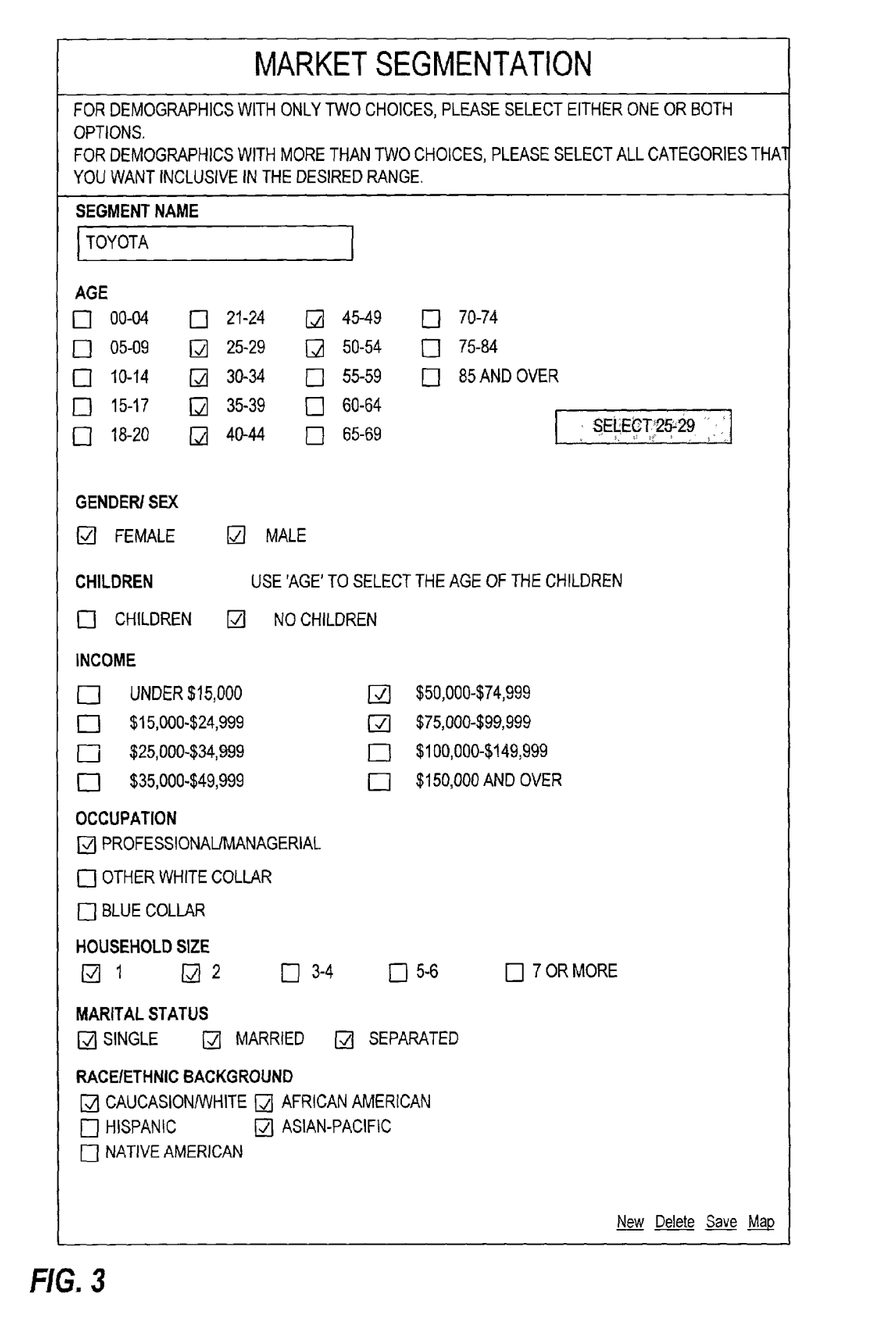
FIG. 3 is an example of a screen displaying a list of segment characteristics selectable by a user according to the present invention.

FIG. 3 shows one example of a screen displaying a list of market segment characteristics selectable by the user for defining his or her market segment, as discussed in Step S10 of FIG. 2A. As shown in FIG. 3, the screen may identify different age brackets, gender/sex, children status, income brackets, occupation, household size, martial status, and race/ethnic background. Other segment characteristics or a different combination of the characteristics shown in FIG. 3 can be included in the screen.

Figure 4:
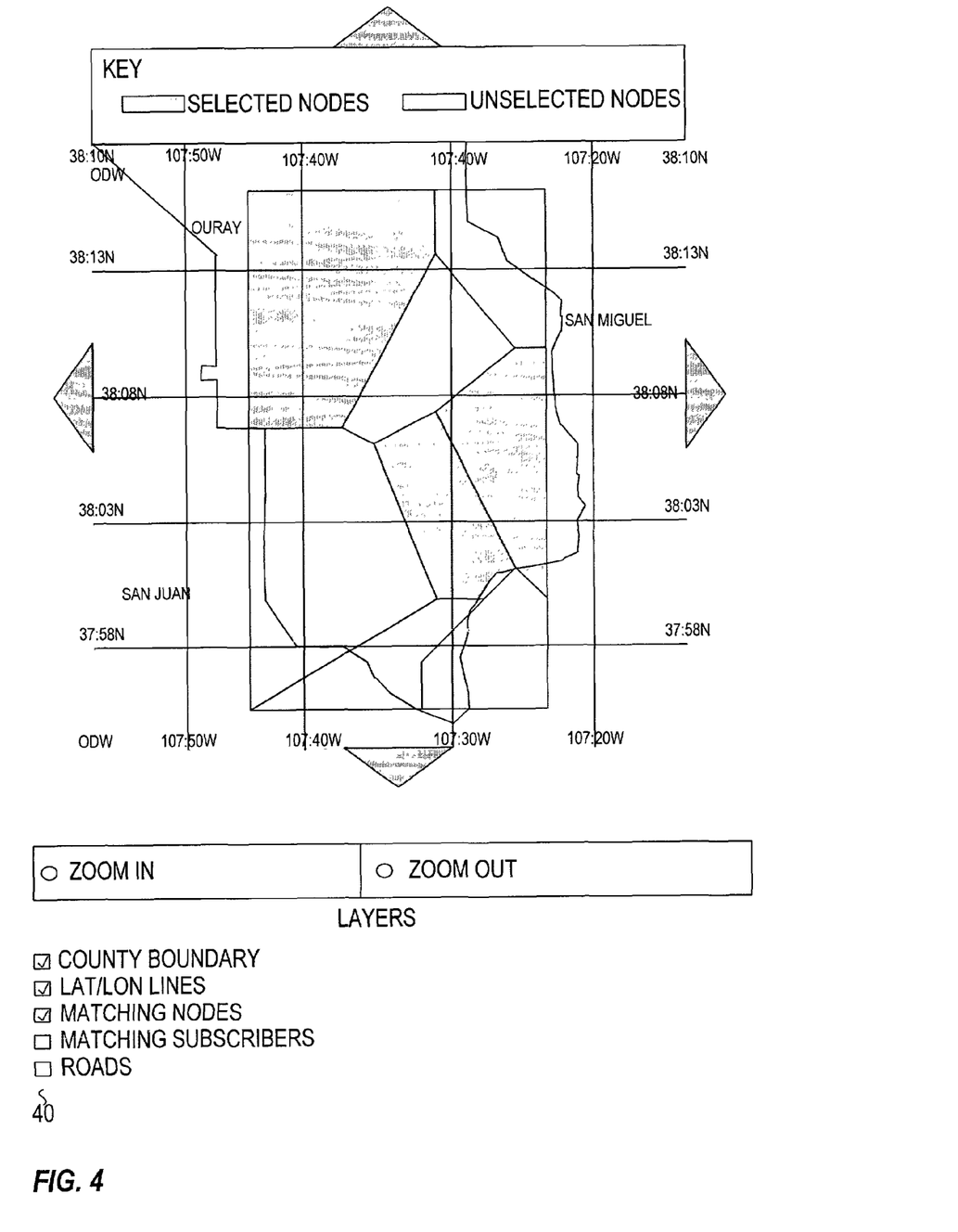
FIG. 4 is an example of a geographical map identifying available addressable units according to the present invention.

FIG. 4 shows one example of a screen displaying a geographical map of the available addressable units, as discussed in Step S22 of FIG. 2A. As shown in FIG. 4, the map may identify the regions wherein those available subscribers or groups of available subscribers (i.e., addressable units) having the user-selected segment characteristics reside. This map may be modified to show different aspects of the available addressable units or to highlight different aspects of the geography. For example, by clicking different boxes or input areas 40 shown on the screen, the user can zoom in and out of the map, and may view the county boundaries, latitude/longitude lines, roads, matching available subscribers data, or matching available nodes of subscribers.

The present invention provides a system, computer code and method by which the advertisers can (1) define advertiser-preferred market segment, (2) receive analyses of the market segment, avail inventory, and avail pricing, and (3) purchase avails, through an interaction with a user interface device such as a PC. The present invention is applicable to any system or network that offers sale of avails. For example, the present invention may be used in conjunction with a queue-based advertisement insertion system which is the subject matter of related co-pending application, U.S. Ser. No. 09/712,790, filed on Nov. 14, 2000, (entitled "Queue Based Advertisement Scheduling And Sales", invented by Charles A. Eldering and Gregory Flickinger and owned by the same assignee of the present invention, which is herein fully incorporated by reference. In this related application, modern television service systems, including, e.g., SDV, DBS, digital cable, or VDSL systems, are configured to perform ad selection and ad insertion at the individual subscriber's device, such as a STB, such that designated ads are inserted into the avails of the channel/program that the subscriber is currently watching, no matter what the channel or program may be. Ads are no longer linked to any particular advertisement spot in any particular program. Therefore, a virtual roadblock can be set up whereby the subscriber will receive the designated ads in the designated order as avails occur in whatever programming he or she is viewing, regardless of the channel, program or time of day. By applying the present invention in such systems, a highly more effective and automated targeted advertising system arises, which enhances the entire advertising process from the point of sale of avails to the display of ads to the subscribers.

Moreover, the present invention may be used in conjunction with any other types of network systems. For example, the present invention may be used in conjunction with an advertisement insertion system such as disclosed in aforementioned PCT Patent Publication No. WO 99/66719 entitled "Techniques for Intelligent Video Ad Insertion."

Accordingly, the present invention allows computer-management and sale of avails for a television programming service network or the like. It provides tools by which any advertiser can quickly assess avail availability and avail pricing for advertising to individuals in the advertiser-preferred market segment. Further, it expedites the avail sale and scheduling process, which conveniences the advertisers. As a result, the present invention provides a more effective avail management system and method that is useful and beneficial to both advertisers and TV programming service networks.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed:

1. A computer-implemented method for managing avail inventory data of media programming streams for a communications network, the method comprising:
   (a) receiving, by a computer, a market segment selection from a user;
   (b) obtaining a record of available addressable units, wherein said available addressable units are characterized as belonging to said selected market segment;
   (c) obtaining an inventory of avails corresponding to said available addressable units; and
   (d) generating, by the computer, a proposed price for avails in said inventory of avails, wherein said proposed price is dependent on said market segment selection.

2. The method of claim 1, wherein said proposed price further depends on a particular programming slot to which each of the avails corresponds.

3. The method of claim 2, wherein each particular programming slot corresponds to a program.

4. The method of claim 3, further comprising:
   (e) determining the likelihood that a generic viewer in said market segment will watch said program to which each of the avails corresponds.

5. The method of claim 4, wherein said proposed price further depends on said likelihood.

6. The method of claim 5, wherein said proposed price further depends on the time that each particular programming slot occurs.

7. The method of claim 3, wherein said proposed price for each of the avails further depends on the corresponding programming slot and the corresponding program.

8. The method of claim 1, wherein the user selects at least one of the avails for purchase from said inventory of avails.

9. The method of claim 1, further comprising:
   (e) receiving a purchase request from the user for the purchase of at least one of the avails from said inventory of avails.

10. The method of claim 1, wherein said generating a proposed price occurs prior to selecting ads to be displayed in said avails of said inventory of avails.

11. The method of claim 1, wherein each of the avails corresponds to a particular programming slot.

12. The method of claim 1, wherein said proposed price further depends on the number of avails that said user purchases.

13. A computer-implemented method for managing avail inventory data of media programming streams for a communications network, the method comprising:
   (a) receiving, by a computer, a programming selection from a user;
   (b) obtaining an inventory of avails corresponding to said programming selection;
   (c) obtaining a listing of available addressable units for avails in the inventory of avails corresponding to said programming selection; and
   (d) generating, by the computer, a price for said avails corresponding to said programming selection based at least in part on the available addressable units.

14. The method of claim 13, further comprising:
   (e) receiving a market segment from said user.

15. The method of claim 14, wherein said listing of addressable units only includes those addressable units that are within said market segment.

16. The method of claim 14, wherein said price for said avails further depends on whether the addressable unit corresponding to the respective avail is within said market segment.

* * * * *